May 13, 1924.
G. SHUMAN
1,494,192
COMBINED CARRIER AND ATTACHMENT
Filed Feb. 12, 1923
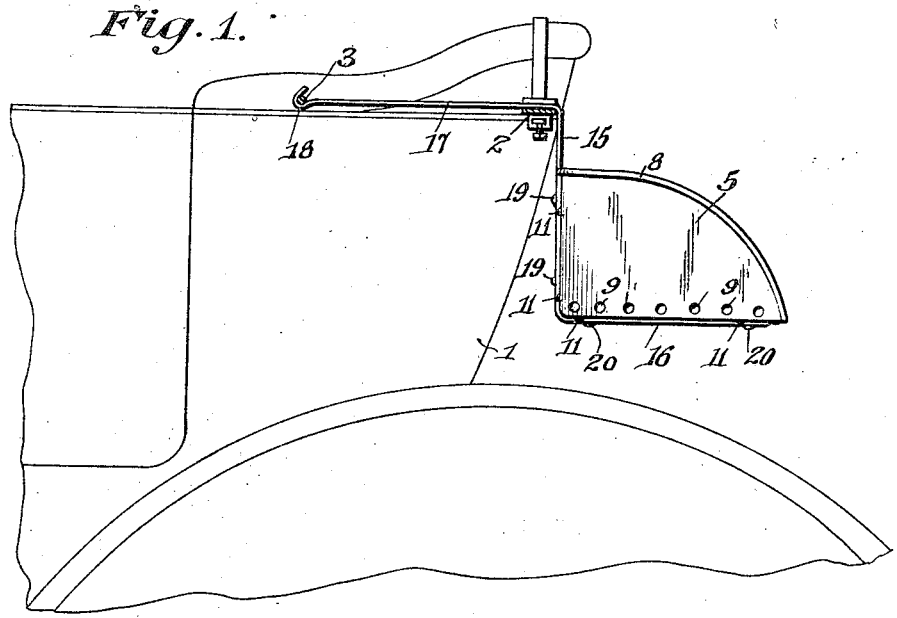
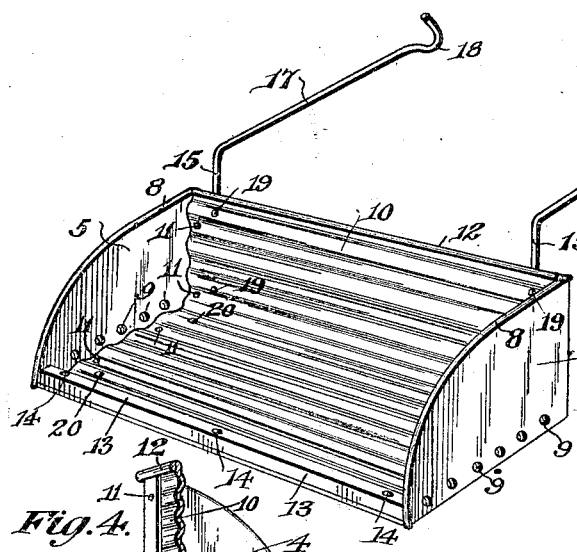
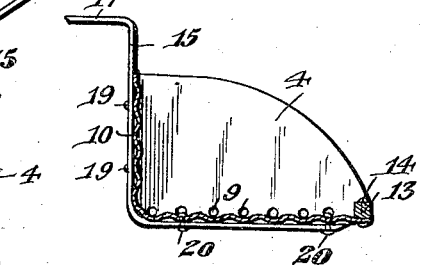
INVENTOR.
George Shuman,
BY
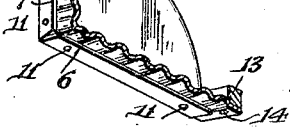 ATTORNEY.

Patented May 13, 1924.

1,494,192

UNITED STATES PATENT OFFICE.

GEORGE SHUMAN, OF NATIONAL CITY, CALIFORNIA.

COMBINED CARRIER AND ATTACHMENT.

Application filed February 12, 1923. Serial No. 618,671.

*To all whom it may concern:*

Be it known that I, GEORGE SHUMAN, a citizen of the United States, residing at National City, in the county of San Diego and State of California, have invented certain new and useful Improvements in Combined Carriers and Attachments, of which the following is a specification.

This invention relates to a combined carrier and attachment therefor, designed primarily for use in connection with motor vehicles for transporting luggage, etc., but it is to be understood that a combined carrier and attachment therefor in accordance with this invention can be employed for any purposes for which it is found applicable, and the invention has for its object to provide in a manner as hereinafter set forth, a combined carrier and attachment therefor capable of being quickly and detachably connected with a vehicle body whereby the carrier element will be maintained in position for receiving and holding luggage, baggage, parcels, boxes, etc., which is desired to be transported through the medium of the vehicle.

A further object of the invention is to provide in a manner as hereinafter set forth, a combined carrier and attachment therefor, capable of being quickly and detachably connected to the rear of a vehicle body in a manner to be out of the way of the passengers entering the vehicle, as well as not interfering with the interior of the vehicle body, and further of a construction to provide for a carrier element of substantial capacity, and one that can be conveniently loaded and unloaded when occasion requires.

A further object of the invention is to provide in a manner as hereinafter set forth, a combined carrier and attachment therefor, capable of being quickly and detachably connected to the rear of a vehicle body and whereby when connected with the vehicle body the carrier element is suspended clear thereof, or in other words, does not rest against the body when in supported position.

Further objects of the invention are to provide a combined carrier and attachment therefor which is simple in its construction and arrangement, strong, durable, compact, thoroughly efficient and convenient in its use, quickly connected with a vehicle body, readily assembled and comparatively inexpensive.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a side elevation of a motor vehicle body, broken away, showing the adaptation therewith of a combined carrier and attachment therefor in accordance with this invention.

Figure 2 is a perspective view of a combined carrier and attachment therefor in accordance with this invention.

Figure 3 is a fragmentary view in cross section.

Figure 4 is a fragmentary perspective view looking toward the rear of the carrier.

Referring to the drawings in detail, 1 denotes a motor vehicle body, 2 the ordinary supporting element which extends out from the back corners of a car body for supporting the car top when it is folded and down, and 3 denotes a pivot bolt which projects laterally from the car body and supports one of the frame members of a vehicle top. The foregoing elements are of known construction and are used in connection with open cars provided with foldable tops.

A combined carrier and attachment therefor in accordance with this invention includes a carrier element and a pair of attaching elements and the said carrier element is in the form of a receptacle of any suitable construction, and the embodiment of the receptacle as illustrated consists of a pair of end members 4, 5, substantially quadrant shaped in elevation and each has its lower portion formed with an inwardly extending flange 6, and its rear portion with a vertically extending flange 7, and each of said members has its upper edge, which is curved, beaded as at 8 for reinforcing purposes. Each of said members 4, 5, near its lower edge is provided with a series of openings 9.

The body portion of the receptacle is indicated at 10, is L-shaped in transverse section, and is formed of corrugated material, preferably sheet metal, for reinforcing purposes and to reduce the denting or bending of the body portion to a minimum when mounting receptacles in the carrier. The setting up of the horizontal part of the body portion corrugated provides grooves or channels for collecting rain water and whereby the water can discharge from the channels through the openings 9. The body portion is mounted on the flanges 6 and against the flanges 7 and is secured to the said flanges by hold-fast devices 11. The upper edge of the vertical portion of the body portion 10 is beaded as at 12.

Secured upon the lower part of the body portion 10 and arranged between the end members 4, 5, is a polygonal-shaped bar 13, which extends from the member 4 to the member 5 and is secured upon the bottom 10 by the hold-fast devices 14.

The attaching means for the carrier includes a pair of attaching base or members, and as each of these members is of the same construction, but one will be described as the description of one applies to the other, and each of said attaching members includes a vertically disposed intermediate portion 15, a lower portion 16 which projects outwardly at right angles with respect to the intermediate portion 15 and further which projects rearwardly with respect to the vehicle body 1. The attaching member further includes an upper portion 17 which extends at right angles with respect to the intermediate portions 15, and in a direction opposite with respect to the direction of the lower portion 16 and further projects forwardly with respect to the vehicle body 1. The forward end of the upper portion 17 is provided with a hook 18. The intermediate portion of the attaching members is secured to the back of the vertical part of the body portion 10 by the hold-fast devices 19, and the lower portion 16 of the attaching member is secured to the lower face of the lower part of the body portion 10 by the hold-fast devices 20. The intermediate portion 15 of the attaching member is extended above, a substantial distance, the bead 12 of the body portion 10.

When the attaching means is connected with the vehicle body 1, the upper portions 17 of the attaching members are mounted on the support 2, as shown in Figure 1, and the hooked ends 18 engage around the bolts 3. The intermediate portions 15 of the attaching members do not rest against the rear of the body portion 1, due to the fact that the latter curves forwardly from said intermediate portions and by this arrangement the carrier is suspended from the rear of the body portion and does not rest thereagainst.

The intermediate portions 15 and lower portions 16 of the attaching members provide what may be termed supporting means for the carrier and the upper portions 17 of the attaching members constitute what may be termed coupling means for detachably connecting the attaching members with the vehicle body.

From the foregoing description taken in connection with the accompanying drawings, a combined carrier and attaching means is set up which can be quickly and detachably connected to the rear of a vehicle body and employed for transporting luggage, etc., and owing to the arrangement of the device at the rear of the vehicle body, it does not interfere with passengers when entering the car and does not take up any of the space within the car body, and although the preferred construction is as shown and described, yet it is to be understood that changes in the details of construction can be had without departing from the spirit of the invention as claimed.

What I claim is:—

1. A combined carrier and attachment comprising an L-shaped body portion including a vertically and a horizontally disposed part, the latter extending outwardly from the lower terminus of the former, a vertically disposed quadrant-shaped element secured to each end of said body portion and providing an end wall therefor, each of said elements having the top edge thereof curving downwardly throughout from the rear to the front thereof, said elements at the rear thereof flush with the top edge of said vertical part and extended to the front edge of said horizontally disposed part, a plurality of angle-shaped attaching members each including a vertical and an upper and a lower horizontal leg, means for securing said horizontal legs to the lower face of said horizontal part, means for securing the vertical legs to the rear face of said vertical part, said vertical legs extending above the top edge of said horizontal part, and said upper horizontal legs extending rearwardly from the upper termini of said vertical legs and terminating at the free terminus thereof in a hook.

2. A combined carrier and attachment comprising an L-shaped body portion including a vertically and a horizontally disposed part, each of said parts being lengthwise corrugated, the latter extending outwardly from the lower terminus of the former, a vertically disposed quadrant-shaped element secured to each end of said body portion and providing an end wall therefor, each of said elements having the top edge thereof curving downwardly throughout from the rear to the front thereof, said elements at the rear thereof flush with the top edge of said vertical part and extended to the front edge of said horizontally disposed part, a plurality of angle-shaped attaching members, each including a vertical and an upper and a lower horizontal leg, means for securing said horizontal legs to the lower face of said horizontal part, means for securing the vertical legs to the rear face of said vertical part, said vertical legs extending above the top edge of said horizontal part, and said upper horizontal legs extending rearwardly from the upper termini of said vertical legs and terminating at the free terminus thereof in a hook and each of said quadrant-shaped elements having its lower portion thereof provided with a row of openings.

3. A combined carrier and attachment comprising an L-shaped body portion including a vertically and a horizontally disposed part, each of said parts being lengthwise corrugated, the latter extending outwardly from the lower terminus of the former, a vertically disposed quadrant-shaped element secured to each end of said body portion and providing an end wall therefor, each of said elements having the top edge thereof curving downwardly throughout from the rear to the front thereof, said elements at the rear thereof flush with the top edge of said vertical part and extended to the front edge of said horizontally disposed part, a plurality of angle-shaped attaching members, each including a vertical and an upper and a lower horizontal leg, means for securing said horizontal legs to the lower face of said horizontal part, means for securing the vertical legs to the rear face of said vertical part, said vertical legs extending above the top edge of said horizontal part, said upper horizontal legs extending rearwardly from the upper termini of said vertical legs and terminating at the free terminus thereof in a hook, and each of said quadrant-shaped elements having its lower portion thereof provided with a row of openings, and a narrow strip secured upon the marginal portion of the upper face of said horizontal part at the free terminus thereof and extending from one of said elements to the other.

4. A combined carrier and attachment comprising an L-shaped body portion including a vertically and a horizontally disposed part, each of said parts being lengthwise corrugated, the latter extending outwardly from the lower terminus of the former, a vertically disposed quadrant-shaped element secured to each end of said body portion and providing an end wall therefor, each of said elements having the top edge thereof curving downwardly throughout from the rear to the front thereof, said elements at the rear thereof flush with the top edge of said vertical part and extended to the front edge of said horizontally disposed part, a plurality of angle-shaped attaching members, each including a vertical and an upper and a lower horizontal leg, means for securing said horizontal legs to the lower face of said horizontal part, means for securing the vertical legs to the rear face of said vertical part, said vertical legs extending above the top edge of said horizontal part, said upper horizontal legs extending rearwardly from the upper termini of said vertical legs and terminating at each terminus thereof in a hook, and each of said quadrant-shaped elements having its lower portion thereof provided with a row of openings, and a narrow strip secured upon the marginal portion of said horizontal part at the free terminus thereof and extending from one of said elements to the other, each of said quadrant-shaped elements having its lower portion provided with a row of openings.

In testimony whereof, I affix my signature hereto.

GEORGE SHUMAN.